United States Patent [19]

Yanagawa et al.

[11] 4,128,334

[45] Dec. 5, 1978

[54] ANCHORAGE FOR A MOVING BODY

[75] Inventors: Nobuyuki Yanagawa, Chigasaki; Kazuaki Tagawa, Tokyo, both of Japan

[73] Assignee: Ricoh Company, Ltd., Tokyo, Japan

[21] Appl. No.: 772,682

[22] Filed: Feb. 28, 1977

[30] Foreign Application Priority Data

Mar. 5, 1976 [JP] Japan .................................. 51-23776
Mar. 5, 1976 [JP] Japan .................................. 51-23777

[51] Int. Cl.[2] ........................ G03B 27/62; G03B 15/00
[52] U.S. Cl. .......................................... 355/75; 355/11
[58] Field of Search .......................... 355/1, 75, 47-51, 355/57, 66, 60, 8, 11

[56] References Cited

U.S. PATENT DOCUMENTS 3,741,646 6/1973 Knechtel et al. ...................... 355/50
3,955,888 5/1976 Kakiuchi et al. ........................ 355/1
3,997,262 12/1976 Doi et al. ............................... 355/11

FOREIGN PATENT DOCUMENTS 534006 9/1931 Fed. Rep. of Germany ............. 355/60

*Primary Examiner*—Donald A. Griffin
*Attorney, Agent, or Firm*—Cooper, Dunham, Clark, Griffin & Moran

[57] ABSTRACT

A copying machine of the scanning exposure type includes an original receptacle or an optical system which is adapted to reciprocate. The original receptacle or optical system is mounted on a rockable support which has one end pivotally mounted on the body of the copying machine. A normally inoperative locking device is interposed between the original receptacle or optical system and its drive mechanism, so that when the rockable support is released and pivoted, the locking device is effective to prevent a movement of the original receptacle or optical system which may result from its weight.

10 Claims, 12 Drawing Figures

53
57
55
50
56
45
54
58
44
d
43
49
51
62
61
52
63
48

ANCHORAGE FOR A MOVING BODY

BACKGROUND OF THE INVENTION

The invention relates to an anchorage for a moving body such as an original receptacle or optical system disposed for reciprocatory movement in a copying machine, which prevents a movement of the moving body by gravity as a rockable top machine portion in which it is located is moved from a horizontal to an inclined position.

In contrast to a copying machine of the flash exposure type, a copying machine of the scanning exposure type includes a movable original receptacle or optical system which is adapted to reciprocate through a given stroke. A drive mechanism for driving a moving body, such as the original receptacle, for reciprocatory motion comprises a drive motor, a gearing connected therewith, means for converting the rotation of the gearing into a reciprocatory motion of the original receptacle, and a clutch for connecting or disconnecting the transmission of the reciprocatory motion.

In a conventional copying machine, the principal parts of the machine such as a photosensitive drum or an optical system are disposed in a stationary manner within the machine. Efforts directed toward achieving a reduction in the size of the machine have resulted in a complex arrangement of the various parts, presenting difficulties in the replacement of the photosensitive member, the cleaning operation of mirrors, and an adjustment of machine parts during the maintenance of the machine. In addition, if a jamming of a copy sheet occurs within a passage through which it is conveyed, extreme difficulty is experienced in its removal.

A copying machine has been proposed which avoids the above disadvantages by providing a top machine portion in which a photosensitive drum, an optical system, a reciprocatory movable original receptacle and a drive mechanism for the latter are disposed. This portion has one end pivotally mounted so that it may be opened to an inclined position in order to facilitate various operations mentioned above. However, when the drive transmission between the drive mechanism and the original receptacle is interrupted, as the top machine portion is released and moved to an inclined position, the original receptacle on the support may tend to move by its own weight. Therefore, it is seen that some means must be provided which prevents a movement of the original receptacle in this arrangement. If the original receptacle is allowed to move, it may move into collision with the table on which it rests, possibly causing damage to the original receptacle or elements on the table. It will also be understood that such an arrangement prevents difficulty in handling.

SUMMARY OF THE INVENTION

It is an object of the invention to provide an anchorage for a moving body such as a movable original receptacle or optical system which prevents its movement by its own gravity when a rockable support on which it is disposed is released.

In accordance with the invention, the anchorage includes a locking device which prevents a movement of the moving body under its own weight as the rockable support is released and moved to its inclined position. The locking device is normally inoperative, but becomes operative when the rockable support is released to prevent movement of the moving body.

Where the moving body represents an original receptacle, the use of the anchorage prevents damage which may be caused to either the original receptacle or a support therefor. Alternatively, if the moving body comprises a movable optical system, the anchorage prevents a displacement or misalignment of the optical system.

DETAILED DESCRIPTION OF PREFERRED EMBODIMENTS

Figure 1:
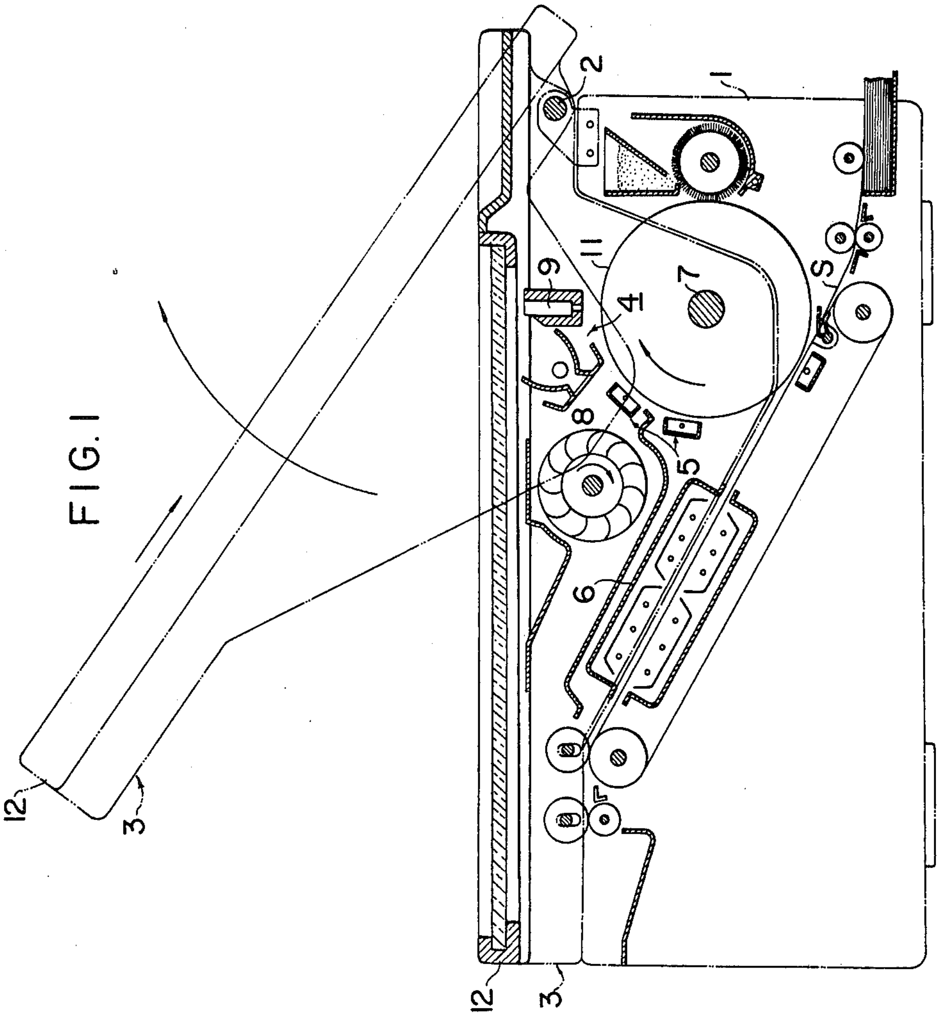
FIG. 1 is a front view of a copying machine having a movable original receptacle to which the invention is applied.

Referring to FIG. 1, there is shown an exemplary copying machine to which the invention is applied. For convenience of description, it is assumed that the machine has a top portion which is constructed in a rockable manner so as to be able to expose the entire sheet passage. Referring to FIG. 1, a machine body is shown at 1, and includes a shaft 2 on which one end of a rockable support 3 is rotatably mounted. The support 3 has an optical system 4, a charger 5 and the upper portion of a fixing unit 6 mounted thereon. The support 3 has a pair of side plates 8, 9 (see FIG. 2) which carry a shaft 7 on which a photosensitive drum 11 is fixedly mounted. The rockable support 3 is manually movable between a closed, horizontal position which it normally assumes during use and an inclined position in which a sheet passage S is entirely exposed to facilitate the removal of a jammed sheet, replacement of a photosensitive member or other maintenance operations. The optical system 4 mounted on the support 3 comprises an optical lamp 8 and a bundle of light focusing fibers (trademark SELFOC) 9. As compared with a conventional optical system which includes a plurality of lenses and mirrors, the use of a single bundle of light focusing fibers permits a reduction in the weight, facilitating the opening and raising of the support 3. The bundle of light focusing fibers 9 and the drum 11 are integrally mounted on the support 3, thereby avoiding an optical misalignment therebetween. It will be appreciated that if the bundle of light focusing fibers 9 is mounted on the support 3 while the drum 11 is mounted on the machine body 1, an optical misalignment may occur each time the support is opened and closed.

Figure 2:
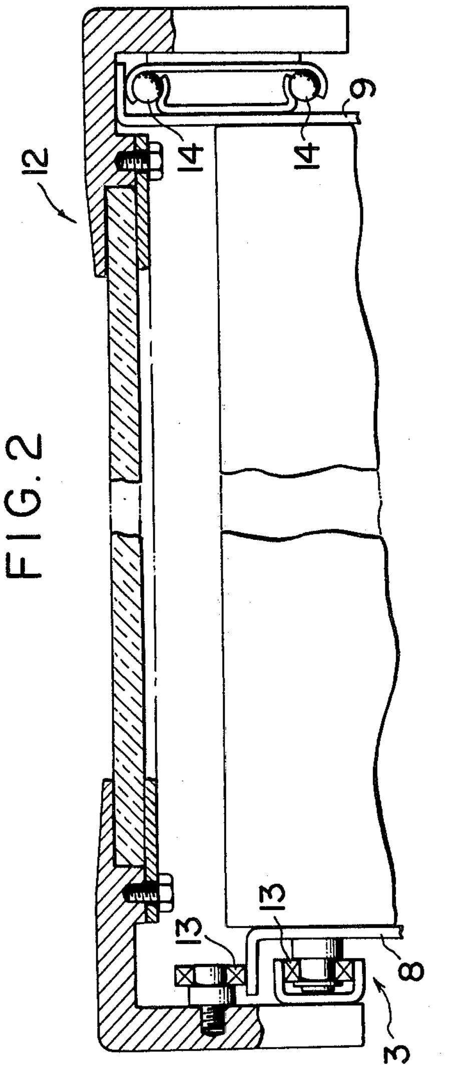
FIG. 2 is a fragmentary side elevation, partly in longitudinal section, of the machine, principally showing the original receptacle.
Figure 3:
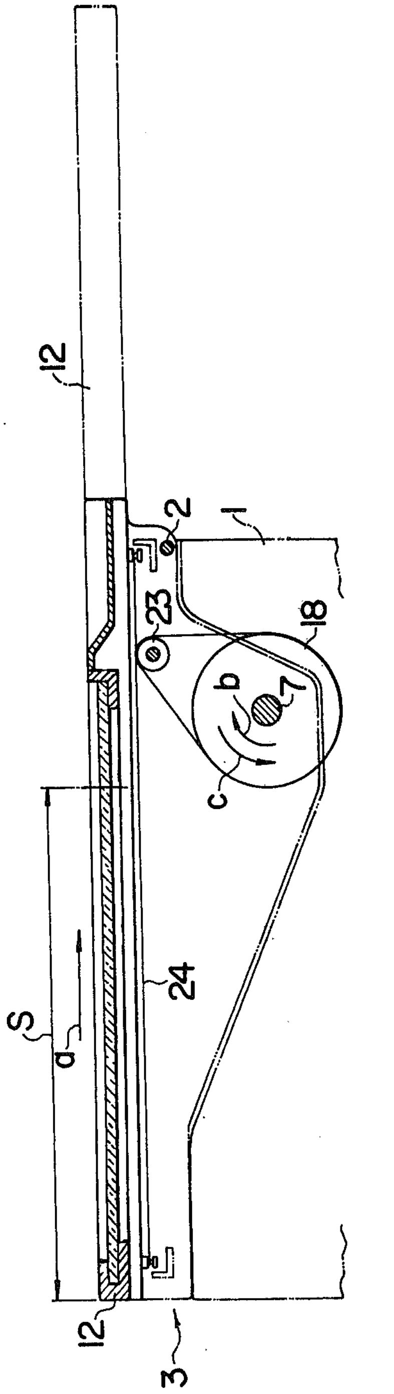
FIG. 3 is a schematic front view of part of the machine, showing a mechanism for moving the original receptacle through a given stroke.
Figure 4:
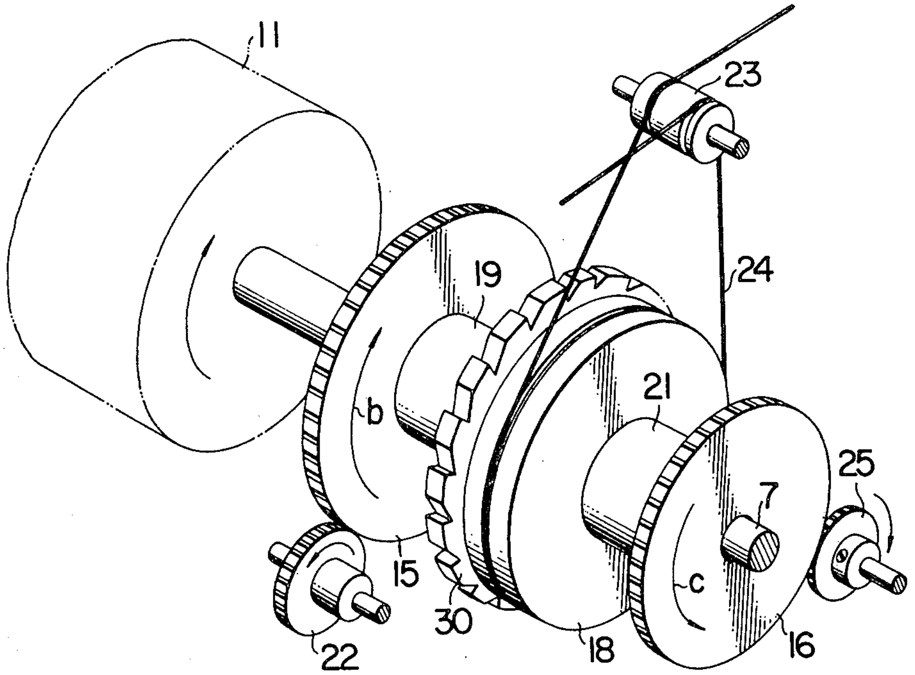
FIG. 4 is a perspective view of the mechanism shown in FIG. 3.

A moving body in the form of an original receptacle 12 is disposed on top of the rockable support 3 for reciprocatory motion. As shown in FIG. 2, the original receptacle 12 is mounted on the both side plates 8, 9 by suitable support means such as bearings 13 and sliding boards 14 so that it can be moved with a reduced force. When a copying operation is to be performed, the original receptacle 12 reciprocates through a stroke S (FIG. 3), and the arrangement is such that a slitwise exposure of the photosensitive drum 11 takes place during a forward stroke indicated by an arrow *a*. A drive mechanism for driving the receptacle 12 for reciprocatory motion is shown in FIG. 4 wherein a forward stroke gear 15 is fixedly mounted on the shaft 7 of the photosensitive drum 11 while a reverse stroke gear 16 is rotatably mounted thereon. A wire drum 18 is also rotatably mounted on the shaft 7, and a pair of electromagnetic clutches 19, 21 are interposed between the drum 18 and both gears. When one of the clutches, 19, is energized, the wire drum 18 is connected with the forward stroke gear 15 which is normally driven by a drive pinion 22 for rotation in a direction indicated by an arrow *b*, thus rotating the drum 18 in the same direction. There is provided a pulley 23 which is connected with the drum 18 through a wire 24, thereby driving the original receptacle 12 through its forward stroke indicated by the arrow *a*. During the reverse stroke, the clutch 19 is deenergized and the clutch 21 is energized to connect the wire drum 18 with the reverse stroke gear 16 which is normally driven by a drive pinion 25 for rotation in a direction indicated by an arrow *c*, thus driving the original receptacle 12 through its reverse stroke as shown in FIG. 3.

When no copying operation takes place, both clutches 19, 21 are deenergized, so that the wire drum 18 is disconnected from the drive mechanism mentioned above, whereby the original receptacle 12 is freely movable by a manual operation. When the original receptacle 12 is freely movable in this manner, if the support 3 is released and moved from its horizontal to its inclined position about the shaft 2, the weight of the original receptacle 12 will cause a movement thereof in a direction indicated by an arrow in FIG. 1 since it is only supported by means such as bearings. This represents a functional and operational difficulty.

Figure 5:
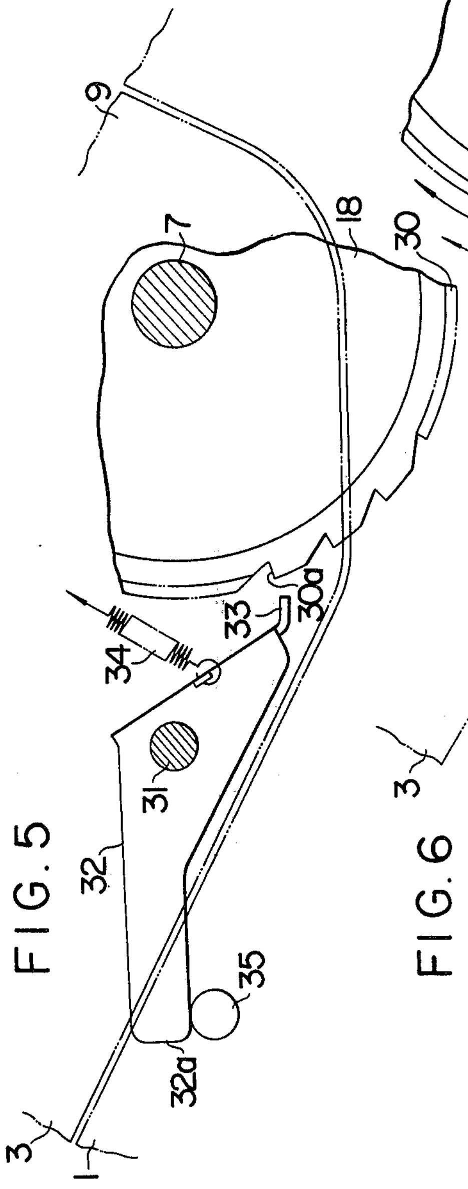
FIG. 5 is a front view of the anchorage constructed in accordance with one embodiment of the invention.

As seen in FIG. 4, a ratchet wheel 30 is integrally or substantially integrally mounted on the wire drum 18 in accordance with the invention in order to overcome such difficulty. Referring to FIG. 5, a shaft 31 is fixedly mounted on the side plate 9 of the rockable support 3 in a cantilever fashion, and a locking member 32 is pivotally mounted on the shaft 31. At one end, the locking member 32 is formed with a pawl 33 which is engageable with one of teeth 30*a* of the ratchet wheel 30. The locking member 32 is biased to rotate counterclockwise about the shaft 31 by a spring 34 so that the pawl 33 can mesh with the teeth on the ratchet wheel 30. However, the resulting counterclockwise rotation of the locking member 32 is limited by the abutment of its other end 32*a* against a stop pin 35 which is fixedly mounted on a side plate of the machine body 1.

Figure 6:
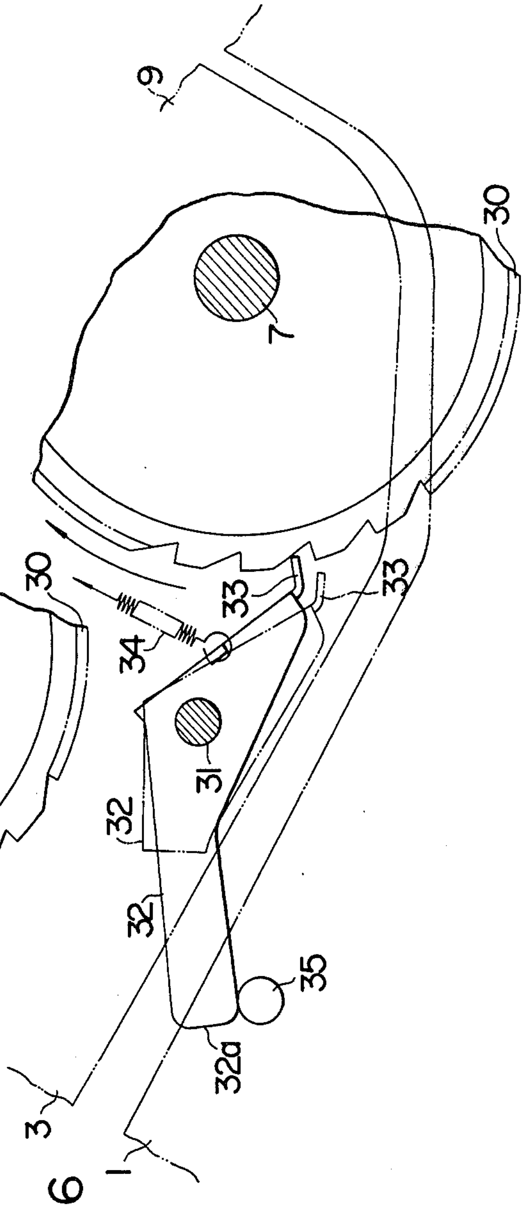
FIG. 6 is a similar front view, illustrating the functioning of the anchorage.

In FIG. 5, the rockable support 3 assumes a horizontal position, and at this time, the pawl 33 on the locking member 32 is removed from engagement with any tooth on the ratchet wheel 30. If the rockable support 3 is moved to its inclined position shown in FIG. 1 in order to remove a jammed sheet, the receptacle 12 tends to move in the direction of the arrow by its own weight. The transmission through the wire 24 causes the ratchet wheel 30 to rotate in a direction indicated by an arrow in FIG. 6, which shows the initial phase of angularly moving the support 3. During an angular movement of the support 3, the end 32*a* of the locking member 32 tends to move away from the fixed stop pin 35, but since the member is biased by the spring 34, the end 32*a* continues its abutting relationship with the stop pin 35 while rotating counterclockwise about the shaft 31 from the position shown in FIG. 5 or the position shown in phantom line in FIG. 6 to a position shown in solid line in FIG. 6, thus bringing the pawl 33 into meshing engagement with one of the teeth 30*a* on the ratchet wheel 30. This prevents a rotation of the ratchet wheel 30 in the direction of the arrow and hence a movement of the original receptacle 12 in the direction shown by the arrow in FIG. 1, thus achieving an automatic locking operation. When the pawl 33 engages the ratchet wheel 30, the end 32*a* of the locking member 32 moves away from the stop pin 35, but the locking engagement between the members 32, 30 is maintained as the rockable support 3 continues to be moved angularly.

When the rockable support 3 is closed, the end 32*a* of the locking member 32 initially bears against the stop pin 35, whereby the member 32 rotates clockwise about the shaft 31 against the resilience of the spring 34, moving the pawl 33 away from the tooth 30*a* of the ratchet wheel 30, thus automatically resetting the locking engagement. It will be appreciated that an automatic locking and resetting operation is made possible by this simple arrangement, eliminating the need for a manual operation of any member.

Figure 7:
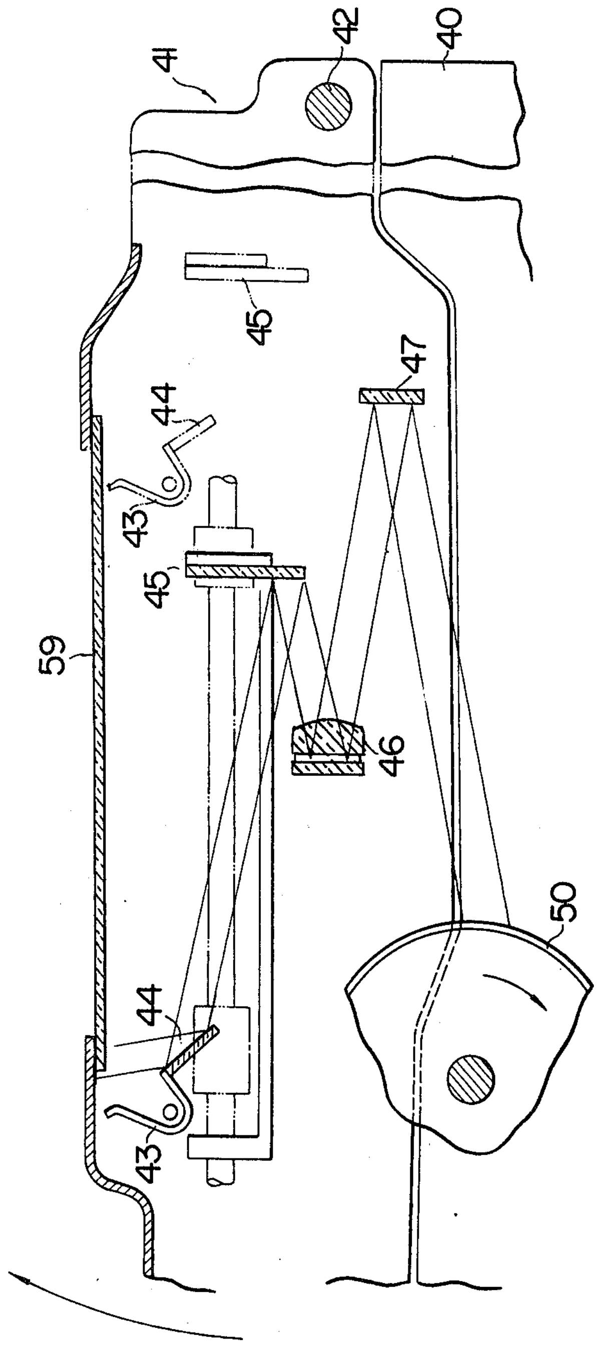
FIG. 7 is a schematic front view of a copying machine having a movable optical system to which the invention is applied.

The invention is equally applicable to a copying machine having a rockable top portion in which an optical system is mounted thereon to move as a moving body through a given stroke. FIG. 7 shows a copying machine of this type. Referring to this Figure, the machine includes a body 40 and a rockable top portion or support 41 which is pivotally mounted on a shaft 42 so as to be rockable in a direction indicated by an arrow. As shown, the rockable support 41 has an optical system mounted thereon which comprises a lamp 43, a first mirror 44, a second mirror 45, in-mirror lens 46 and a fourth mirror 47. As will be described below, the lamp 43 and the first and the second mirrors 44, 45 are adapted to be moved through given distances at given speeds.

Figure 8:
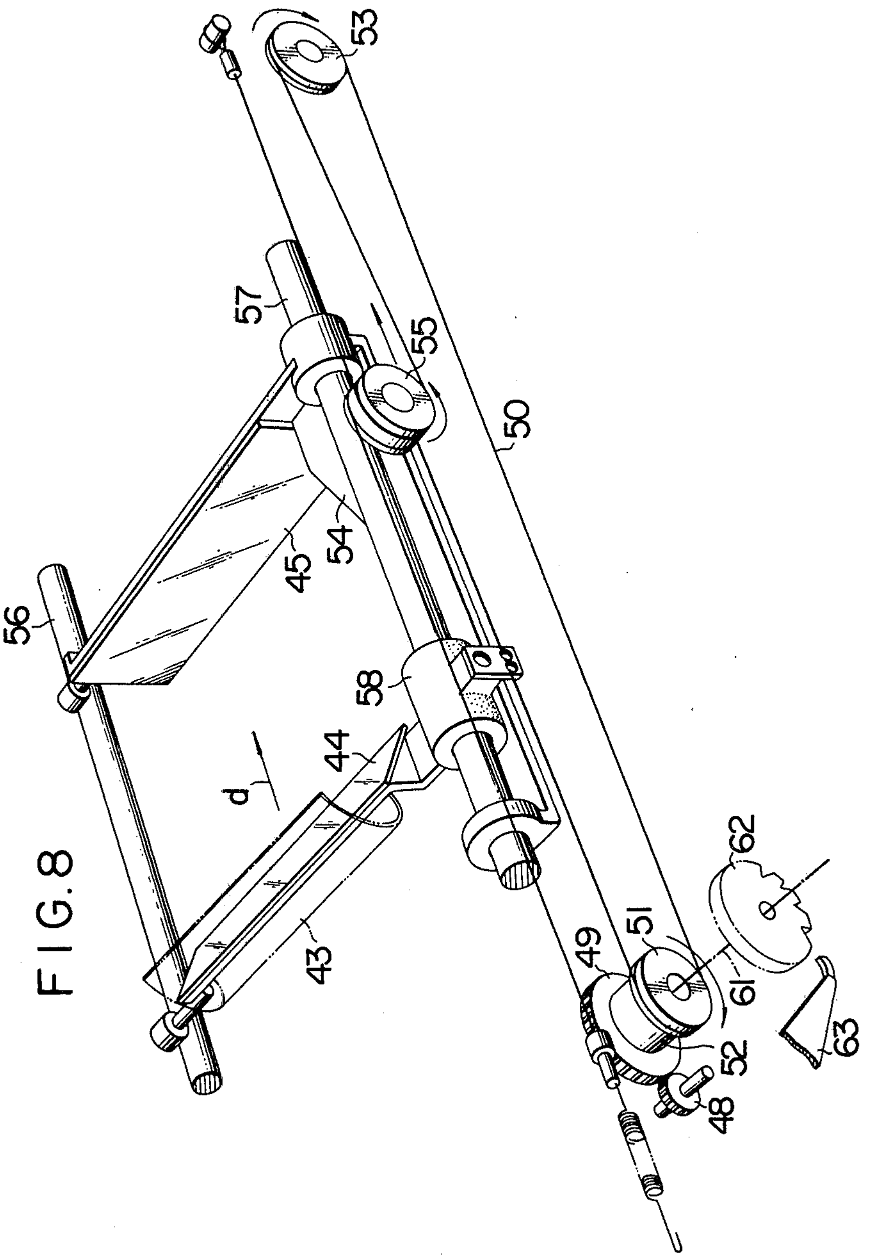
FIG. 8 is a perspective view of a drive mechanism for the optical system shown in FIG. 7.

Referring to FIG. 8, the drive mechanism for the optical system comprises a gear 49 which is driven by a reversible drive pinion 48 and which may be connected with a fixed drive pulley 51 through an electromagnetic clutch 52. A wire 50 extends around the pulley 51 and another fixed pulley 53 and thence around a movable pulley 55, after which it returns to the initial pulley 51. Intermediate the pulley 51 and the movable pulley 55, the wire is fixedly connected with a support member 58 which is slidably mounted on a guide stay 57. The lamp 43 and the first mirror 44 are fixedly connected with the support member 58 and slidable along another guide stay 56. The movable pulley 55 is rotatably mounted on a support member 54 which is slidably mounted and on which the second mirror 45 is mounted. The mirror 45 is also slidable along the stay 56. When the clutch 52 is energized, the pulley 51 rotates in a direction indicated by an arrow, whereby the pulley 55 moves in a direction indicated by an arrow. The first mirror 44 moves in a direction indicated by an arrow *d* together with the lamp 43, while the second mirror 45 moves in the same direction but with one-half the speed of the first mirror 44. During such forward movement, an electrostatic latent image which corresponds to an original placed on a stationary original receptacle 59 is formed on a rotating photosensitive drum 50 shown in FIG. 7. During a reverse stroke, the drive pinion 48 is rotated in the opposite direction to return the movable optical system by rotating the pulley 51 in the opposite direction as the electromagnetic clutch 52 is energized.

Referring to FIG. 7, it will be noted that a path of movement of a copy sheet is located below the optical system which is mounted on the rockable support 41. It will be appreciated that when the rockable support 41 assumes an inclined position, the movable optical system may tend to move by its own weight. Referring to FIG. 8, when the drive mechanism is inoperative or when the clutch 52 is deenergized, the pulley 51 is freely rotatable about a shaft 61. As a consequence, components such as shown at 44, 45 of the optical system may move in the forward direction by their own weight as the support 41 assumes its inclined position. In accordance with the invention, a ratchet wheel 62 is integrally or substantially integrally provided with the pulley 51, and a locking member 63 is mounted on a side plate (not shown) of the rockable support 41. Additionally, a stop pin (not shown) is mounted on a side plate of the body 40, thereby providing an arrangement which is generally similar to that shown in FIGS. 5 and 6. In this manner, a movement and a resulting optical misalignment of the optical system can be prevented when the rockable support 41 is brought to its inclined position.

Figure 9:
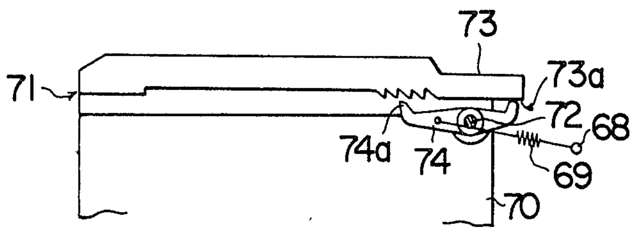
FIG. 9 is a front view of a further embodiment of the invention.
Figure 10:
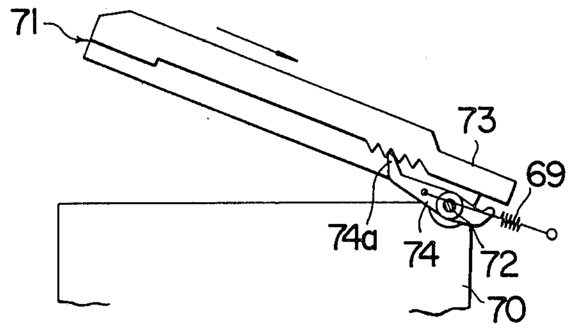
FIG. 10 is a front view showing the functioning of the embodiment shown in FIG. 9.

FIG. 9 shows a further embdoment of the invention in which the machine includes a body 70 and a rockable support 71 which is pivotally mounted on a shaft 72 which is provided on part of the body 70. A moving body 73 such as an original receptacle is disposed on the support 71 for reciprocatory motion. In this embodiment, the bottom of the moving body 73 is partly formed with a series of sawteeth, and a locking member 74 is pivotally mounted on the shaft 72 and has one end formed as a pawl **74*a* which can be brought into engagement with one of the teeth on the moving body 73. An over-center spring 69 extends between the locking member 74 and a stationary pin 68. When the rockable support 71 is rocked clockwise about the shaft 72, a lower edge 73*a* of the moving body 73 bears against the other end of the locking member 74 to cause it to rotate clockwise. Upon passing over a change point, the spring 69 exerts a force, whereby the locking member 74 is further driven clockwise and the pawl 74*a* moves into meshing engagement with one of the teeth on the moving body, as shown in FIG. 10. In this manner, the locking member 74 prevents a movement of the moving body 73 in a direction indicated by an arrow in FIG. 10, and the locking operation is maintained by the abutment of the lower end of the moving body 73 against the locking member 74. When the rockable support 71 is closed, the locking member 74 initially rotates counterclockwise in integral relationship with the moving body 73, but when the change point is passed over, the spring 69 again exerts a force, whereby the locking member 74 is further driven counterclockwise independently from the moving body 73, thus releasing the meshing engagement between the pawl 74*a*** and one of the teeth.

Figure 12:
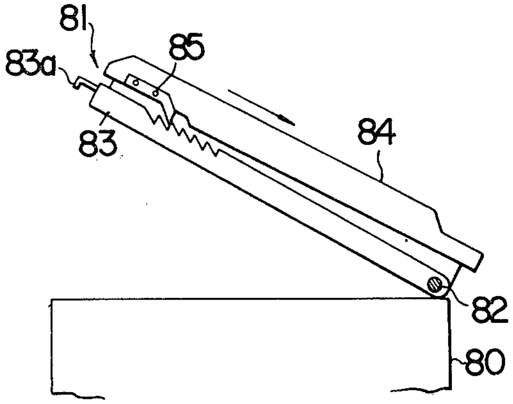
FIG. 12 is a similar view showing the functioning of the embodiment shown in FIG. 11.
Figure 11:
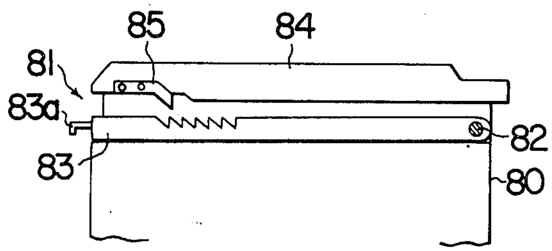
FIG. 11 is a front view of yet another embodiment of the invention.

FIG. 11 shows an additional embodiment of the invention. The machine includes a body 80 and a rockable support 81 which is pivotally mounted on a shaft 82 provided on part of the body 80. The rockable support is provided with a locking rod 83 which is formed with a series of sawteeth. The rod 83 is provided with a handle **83*a*, which may be gripped by hand to move angularly the rockable support 81 in an opening direction, as indicated in FIG. 12. A moving body 84 in the form of an original receptacle is disposed on the rockable support 81, and is provided with a locking member 85, which may be engaged with the teeth on the rod 83, thus preventing a movement of the original receptacle when body 84** is inclined.

What is claimed is:

1. In a copying apparatus comprising:
- a fixed body portion;
- a rockable support pivotally mounted on the fixed body portion and movable between a closed position which it assumes during normal operation of the apparatus and an open inclined position with respect to the fixed body portion;
- means for scanning an original to be copied comprising a moving body mounted for reciprocatory motion on said rockable support; and
- a drive mechanism for engaging and driving the moving body in reciprocatory motion when the rockable support is in its closed position; the improvement comprising an anchorage for the moving body, the anchorage comprising:
- a locking means for preventing a movement of the moving body by its own weight when the rockable support is angularly moved toward the open position and the engagement between the drive mechanism and the moving body is interrupted, said locking means being automatically engageable by the shift in moving body weight in response to the angular movement of said support and the disengagement of said body and drive mechanism.

2. An apparatus according to claim 1 in which the moving body comprises an original receptacle of a copying machine on which an original is placed.

3. An apparatus according to claim 2 in which the original receptacle comprises a series of sawteeth, and said locking means comprises a locking member pivotally mounted on the rockable support and having a pawl at one end, and means for rotating the locking member as the rockable support is angularly moved together with the original receptacle thereon, thereby bringing the pawl into engagement with one of the teeth to prevent a movement of the original receptacle.

4. An apparatus according to claim 2 in which the locking means further comprises a locking member fixedly mounted on the original receptacle and having a pawl, and a rod mounted on the rockable support and formed with a series of sawteeth, such that a selected one of the teeth is brought into engagement with the pawl of the locking member as the rockable support is angularly moved, thereby preventing a movement of the original receptacle.

5. An apparatus according to claim 1 in which the moving body comprises an optical system of a copying machine which is movable for performing a scanning exposure.

6. An apparatus according to claim 1 in which the locking means further comprises a ratchet wheel mounted on the drive mechanism; a locking member pivotally mounted on the rockable support and formed with a pawl; and means for rotating the locking member in a direction to bring the pawl into meshing engagement with a selected one of the teeth on the ratchet wheel as the rockable support is angularly moved, thereby preventing a movement of the moving body.

7. In a copying machine of the type including:

a main body portion;

an original receptacle supporting means mounted on said main body portion for pivoting between a closed level position and an open position inclined with respect to said main body portion; and original scanning means mounted on said supporting means for reciprocating movement thereon; the improvement comprising means for holding said scanning means against movement by its own weight on said supporting means when said supporting means is in the open inclined position comprising:

first means operatively connected to said scanning means for movement in conjunction with the reciprocating movement thereof; and second means for automatically locking said first means against said conjunctive movement in response to the pivoting of said supporting means to the open position whereby said scanning means is held against movement by its own weight on said supporting means while in the open position.

8. A machine as in claim 7 wherein said scanning means comprises an original receptacle, said first means comprises at least one sawtooth on said original receptacle, and said second means comprises:

a locking member pivotably mounted on said supporting means and having a pawl thereon; and means for pivoting the locking member in response to the pivoting of said supporting means to the open position whereby said pawl is brought into engagement with said sawtooth to prevent movement of the original receptacle on said supporting means.

9. A machine as in claim 7 wherein said scanning means comprises an original receptacle, said first means comprises a locking member fixedly mounted on the original receptacle and having a pawl thereon, and said second means comprises rod means mounted on said supporting means and having at least one sawtooth thereon for engaging said pawl on said locking member in response to the pivoting of said supporting member to the open position whereby movement of the original receptacle on the supporting means is prevented while in the open position.

10. A machine as in claim 7 further comprising drive means for driving the scanning means in reciprocating movement when said supporting means is in the closed level position, and wherein said first means comprises a ratchet wheel mounted on said drive means and said second means comprises:

a locking member pivotably mounted on said supporting means and having a pawl thereon; and means for rotating the locking member to bring said pawl into engagement with said ratchet wheel upon the pivoting of said supporting means to the open position whereby movement of the scanning means on said supporting means is prevented while in the open position.

* * * * *